United States Patent
Masood et al.

(10) Patent No.: US 10,163,064 B2
(45) Date of Patent: Dec. 25, 2018

(54) METHODS AND SYSTEMS FOR CONNECTED SALES ASSOCIATE SERVICES

(75) Inventors: Rafeh Masood, Bartlett, IL (US); Jason Hixenbaugh, Elgin, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 173 days.

(21) Appl. No.: 13/438,592

(22) Filed: Apr. 3, 2012

(65) Prior Publication Data

US 2013/0262167 A1    Oct. 3, 2013

(51) Int. Cl.
*G06Q 10/06* (2012.01)
*G06Q 30/02* (2012.01)
*G06Q 30/06* (2012.01)
*G06Q 10/10* (2012.01)

(52) U.S. Cl.
CPC ..... *G06Q 10/0631* (2013.01); *G06Q 10/1091* (2013.01); *G06Q 30/0201* (2013.01); *G06Q 30/0641* (2013.01); *G06Q 10/063118* (2013.01)

(58) Field of Classification Search
CPC ....... G06Q 10/063118; G06Q 10/0631; G06Q 10/1091; G06Q 30/0201; G06Q 30/0641
USPC ...................... 705/7.12, 7.29, 32, 27.1, 7.17
See application file for complete search history.

(56) References Cited

U.S. PATENT DOCUMENTS

| | | | |
|---|---|---|---|
| 5,553,312 A | 9/1996 | Gattey | |
| 6,774,765 B1 | 8/2004 | Goodwin, III | |
| 7,782,177 B1 | 8/2010 | Green | |
| 2003/0132298 A1 | 7/2003 | Swartz | |
| 2004/0002386 A1* | 1/2004 | Wolfe et al. | 463/42 |
| 2004/0122752 A1* | 6/2004 | Horne et al. | 705/32 |

(Continued)

FOREIGN PATENT DOCUMENTS

WO   WO 2001/33392 A2 *   5/2001   ............. G06F 17/00

OTHER PUBLICATIONS

Home Depot Inc. Investor & Analyst Conference—Final, Fair Disclosure Wire (Dec. 2010), retrieved from https://dialog.proquest.com/professional/docview/820335414?accountid=161862 (Year: 2010).*

(Continued)

*Primary Examiner* — Charles Guiliano
(74) *Attorney, Agent, or Firm* — McAndrews, Held & Malloy, Ltd.

(57) ABSTRACT

A method and system for providing a connected sales associate service application via a mobile device. The application provide for an integrated platform upon which various tools for providing support to a sales associate are built. The application includes a database of information regarding the sales associates and operational information regarding a retail establishment, and provides a user interface for allowing the sales associate to access a central server for the retail establishment along with multiple additional sales associates on multiple additional mobile devices. The user interface displays information regarding trending sales data for the retail establishment and information regarding the sales associates accessing the central server. A sales associate can select and display information regarding one of the sales associates accessing the central server to at least one of view, create, delete, or assign a task to the selected sales associate.

24 Claims, 14 Drawing Sheets

(56) References Cited

U.S. PATENT DOCUMENTS

| | | | |
|---|---|---|---|
| 2006/0126560 A1 | 6/2006 | Wotherspoon | |
| 2008/0109286 A1 | 5/2008 | Johnson et al. | |
| 2008/0183563 A1* | 7/2008 | Raffel et al. | 705/10 |
| 2008/0231432 A1* | 9/2008 | Stawar et al. | 340/425.5 |
| 2009/0135751 A1 | 5/2009 | Hodges | |
| 2009/0179753 A1 | 7/2009 | Bonner | |
| 2009/0319344 A1 | 12/2009 | Tepper et al. | |
| 2011/0029339 A1 | 2/2011 | Callahan | |
| 2011/0231272 A1* | 9/2011 | Englund et al. | 705/21 |
| 2011/0288962 A1 | 11/2011 | Rankin, Jr. et al. | |
| 2011/0299454 A1 | 12/2011 | Krishnaswamy | |
| 2012/0190386 A1* | 7/2012 | Anderson | G01C 15/04 455/456.3 |
| 2012/0191522 A1* | 7/2012 | McLaughlin et al. | 705/14.23 |
| 2012/0296987 A1* | 11/2012 | Cuervo | H04L 51/20 709/206 |
| 2013/0219411 A1* | 8/2013 | Meeker et al. | 719/313 |

OTHER PUBLICATIONS

Int'l Search Report and Written Opinion for PCT/US2013/32316 dated Jun. 4, 2013.

PTO, Notification Concerning the Transmittal of International Preliminary Report on Patentability, in Application PCT/US2013/032316, dated Oct. 16, 2014 (5 pages).

PCT, Notification Concerning the Transmittal of International Preliminary Report on Patentability, in International application No. PCT/US2013/041937, dated May 28, 2015 (6 pages).

PCT, Notification of Transmittal of the International Search Report and the Written Opinion of the International Searching Authority, or the Declaration, in International Application No. PCT/US2013/041937, dated Aug. 26, 2013 (7 pages).

Sears Holdings Business Requirements: Reference App & Search, Proof of Concept, pp. 1-5; Jan. 20, 2012.

Sears Holdings Business Requirements: Reference, Iteration 4—Migration; WorkLenz ID#13593, pp. 1-4, Apr. 18, 2012.

Sears Holdings Business Requirements: Reference, Iteration 3—Production, WorkLenz ID#13593, pp. 105; Apr. 18, 2012.

Sears Holdings Business Requirements: Reference & Search, Iteration 2—Design, WorkLenz ID#13593, pp. 1-9; Apr. 2, 2012.

Sears Holdings Business Requirements: Reference App & Search Pilot; WorkLenz ID#13593, pp. 1-8, Mar. 6, 2012.

Internet printout of Getting Started: Building for Applie iPhone, iPad and iPod Touch; pp. 1-5; May 24, 2012.

Internet printout of Sipon—VoIP for iPhone and iPod Touch, pp. 1-5; May 24, 2012.

3com Builds Secure Converged Network Solutions for teh Retail Industry; Delivers Enhanced Shopping Experience, Increased Effectiveness and Secure Storm Communications; Sponsors retail data security forum, Business Wire, Nov. 7, 2005.

\* cited by examiner

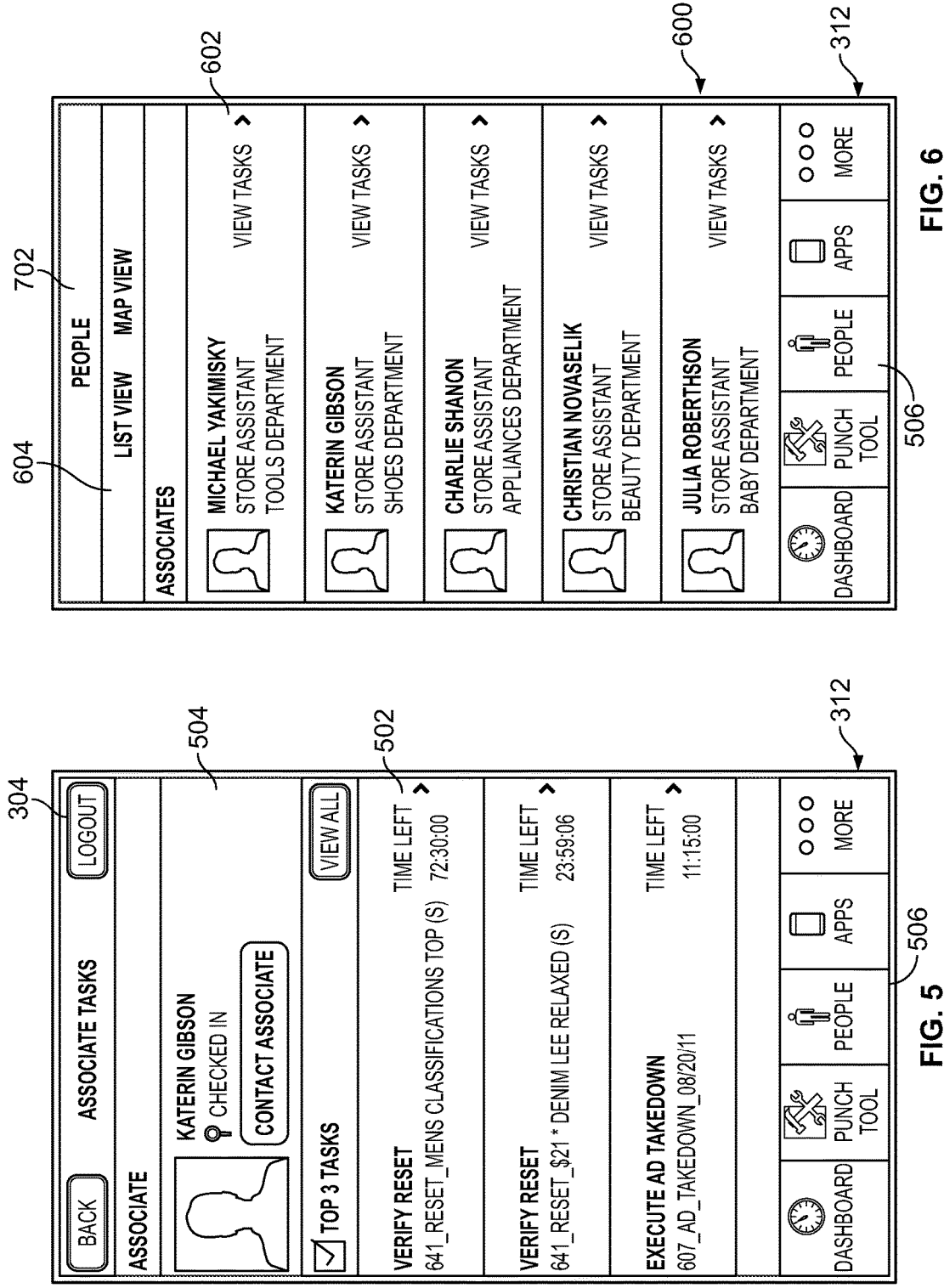

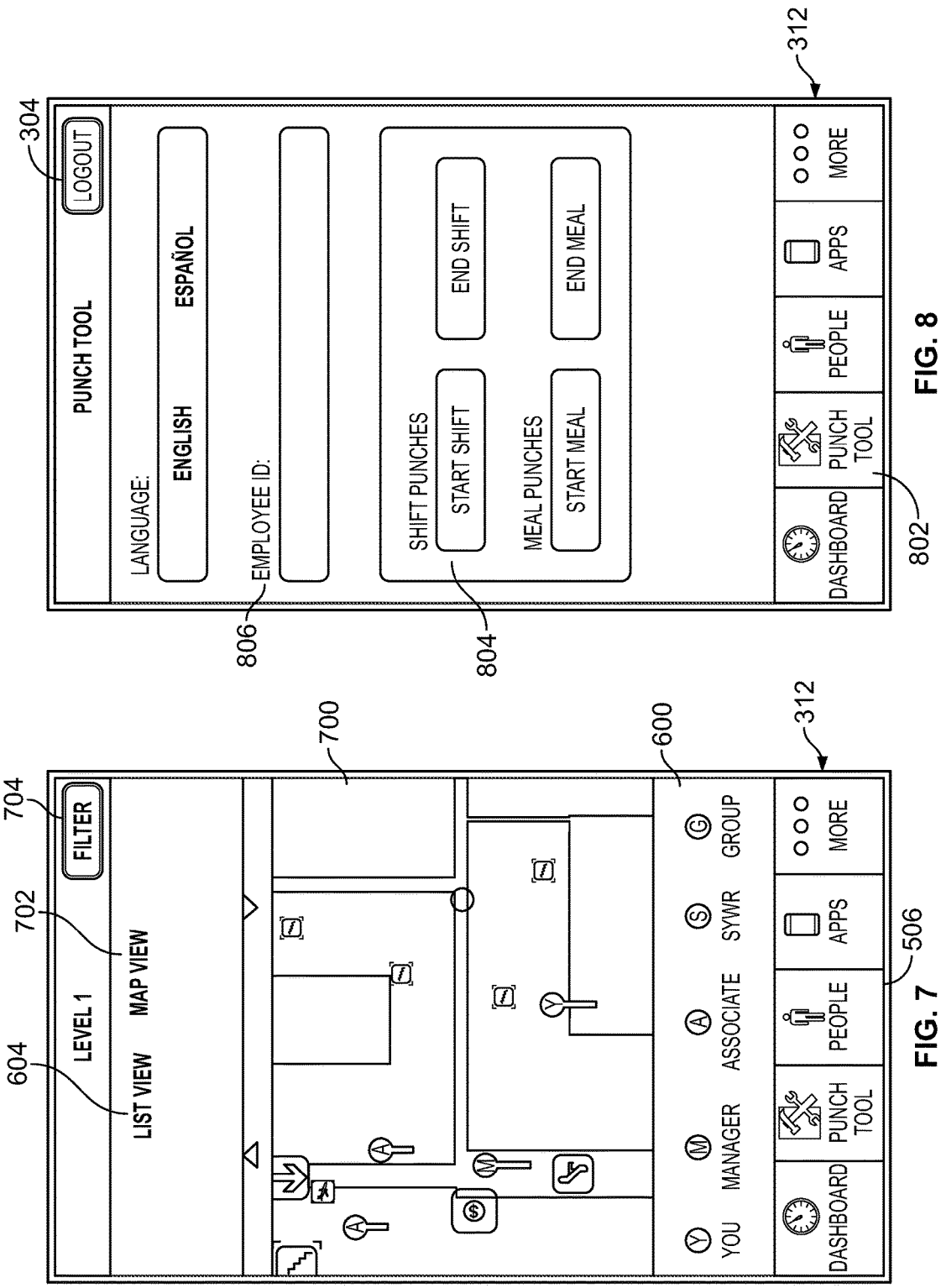

| BACK | SYWR SIGNUP |
|---|---|

CONFIRM THE INFORMATION BELOW AND
HIT SUBMIT WHEN CORRECT.

EMAIL  [EDIT]
JOHNDOE@YAHOO.COM

FIRST NAME  [EDIT]
JOHN

LAST NAME
DOE

ZIP CODE
60602

HOME PHONE
312-555-5555

[SUBMIT]

| BACK | SYWR SIGNUP |
|---|---|

SYWR ACCOUNT

[CARDLESS]

OR

[SCAN CARD]

OR

MANUALLY ENTER THE BARCODE

BACK    SET COMMON APPS    LOGOUT

PLEASE SELECT THE APPS THAT WILL BE DISPLAYED AS MOST COMMON APPS IN YOUR DASHBOARD BY TAPPING THE SLOT AND SELECTING THE APP.

| COMMON APP 1 | APP NAME > |
| COMMON APP 2 | APP NAME > |
| COMMON APP 3 | APP NAME > |
| COMMON APP 4 | APP NAME > |

— 1800

DASHBOARD | PUNCH TOOL | PEOPLE | APPS | MORE

FIG. 17

BACK    SYWR SIGNUP

CUSTOMER E-MAIL

⊙ JOHN DOE HAS BEEN ENROLLED

E-MAIL
[                    ]

RETYPE E-MAIL
[                    ]

CANCEL        NEXT

— 1700

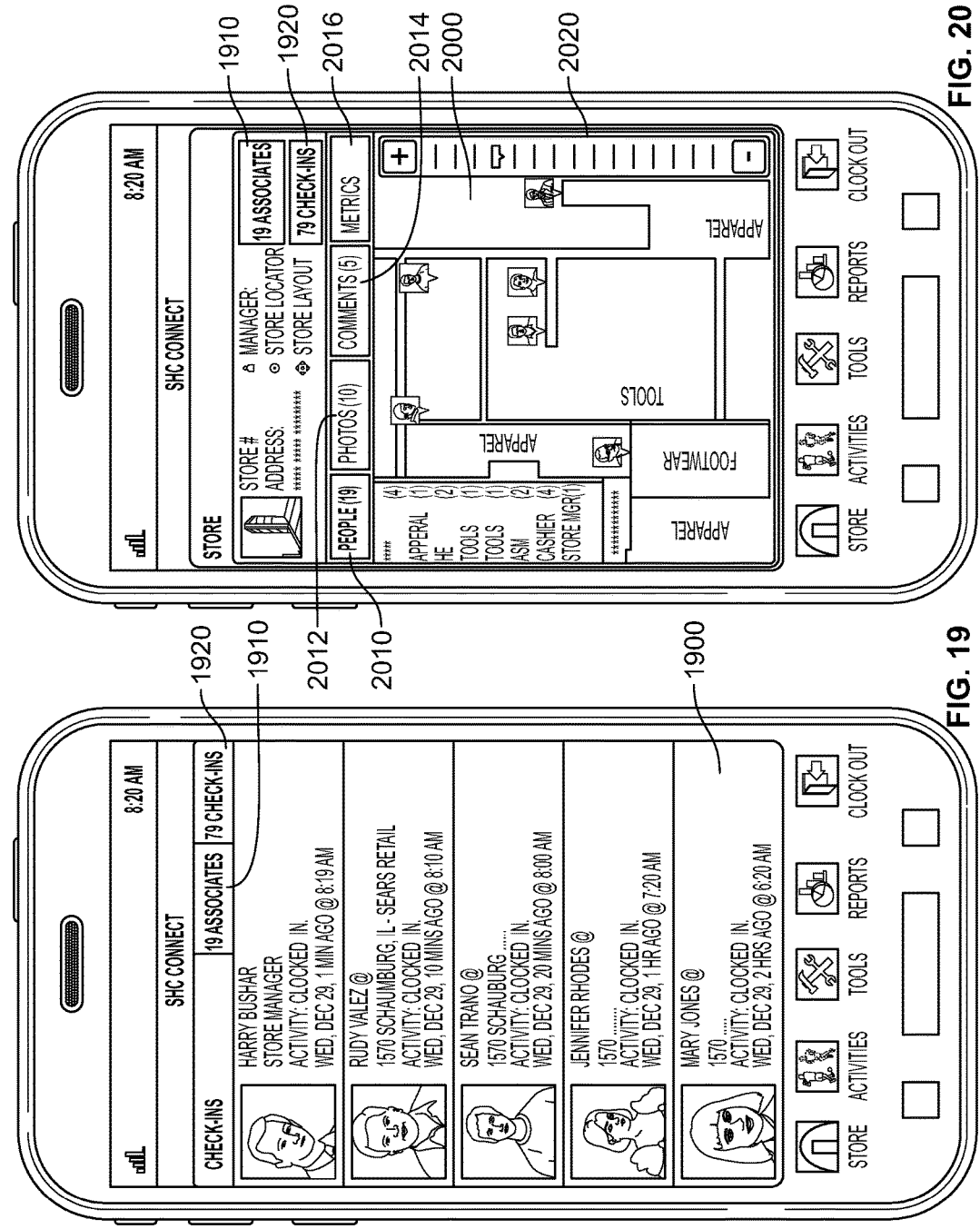

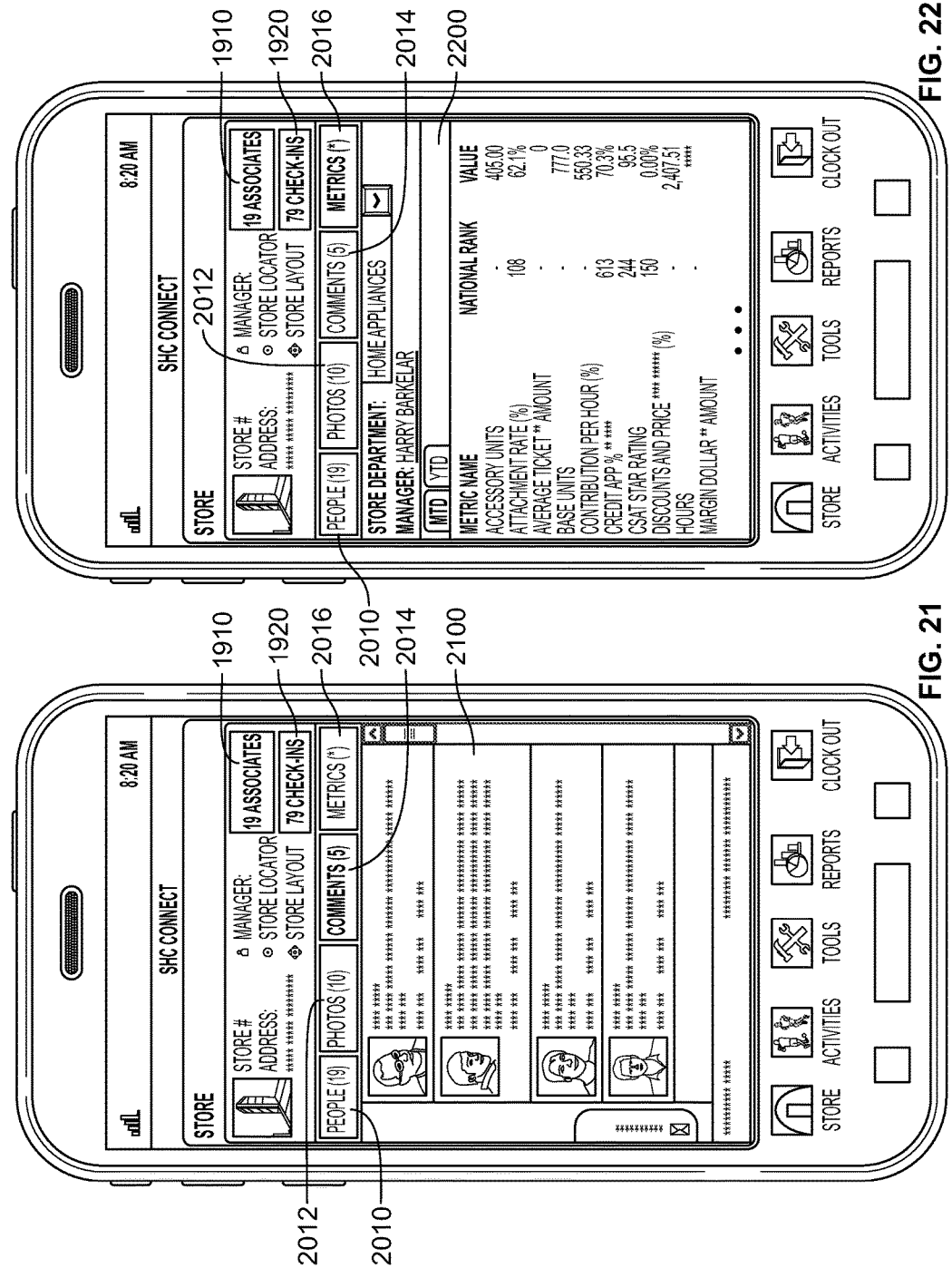

METHODS AND SYSTEMS FOR CONNECTED SALES ASSOCIATE SERVICES

FIELD OF THE DISCLOSURE

The present description relates generally to multi-channel connectively of a sales force and more particularly to methods and systems for providing connected sales associate services.

BACKGROUND OF RELATED ART

In-store sales associates have traditionally been provided with basic in-store electronic support including, for example, point-of-sale (POS) support. Traditionally, POS support has been embodied by an in-store non-mobile cash-register that is centrally located to allow customers to pay for merchandise, and to allow sales associates to provide limited, stationary sales support, such as product lookups, sales manuals, etc.

Recent developments of robust mobile devices has lead to an implementation of a mobile platform POS support system. For example, US Patent publication No. 2011/0231272 is directed to a retail mobile POS software application that provides mobile POS support to retailers. The described system includes a scanner and iPod touch coupled with a retail POS system, and uses a touch screen interface to POS features a salesperson would typically use to help a guest, including purchases with credit, gift and debit cards, cash, and making returns. The mobile system also combines iPod Touch features with a magnetic stripe reader, barcode scanner, and software to speed plastic and cash transactions.

For credit card and instant credit transactions, guests or purchasers, write their signature on the device using finger entry and control. Any employee who has the portable electronic device can accept cash transactions. After entering all the products and totaling the cost, the employee presses an on-screen "Cash" button to electronically open one of any number of cash drawers installed around the store. Guests (or purchasers) will continue to have the option to receive a printed or e-mailed receipt, or both.

The described mobile POS software application, however, is limited in that it is simply an extension of the traditional POS system. Today's sales associates, however, demand additional mobile access to multichannel processing and support systems to provide for enhanced sales activities. Thus, while the background systems and methods identified herein, generally work for their intended purpose, the subject disclosure provides improvements thereto, particularly by providing systems and methods for connected sales associate services by provided mobile connectivity to various sales support systems through a single integrated mobile device.

SUMMARY

In the present application, the systems and methods disclosed provide for an integrated platform upon which various tools for providing support to a sales associate are built. Specifically, the present application discloses an integrated system for electronically providing relevant sales information and/or tools to a sales associate such that the sale associate is capable of actively performing their service job. The system provides for mobile and/or desktop device connectivity and includes multi-channel integration in a social networking and retail environment, as well as reward, financial, marketing and/or POS services.

BRIEF DESCRIPTION OF THE DRAWINGS

For a better understanding of the present disclosure, reference may be had to various examples shown in the attached drawings.

FIG. 5 illustrates an example method by which a user may view task associated with a selected connected user.

FIG. 6 illustrates an example method by which a user may view a listing of sales associates connected through the application.

FIG. 7 illustrates an example method by which a user may view a map illustration of sales associates connected through the application.

FIG. 8 illustrates an example method by which a user may punch-in and/or punch-out for time keeping purposes.

FIGS. 15-17 illustrate an example method by which a user may add a customer to a rewards program.

FIG. 18 illustrates an example method by which a user may customize the application layout of the example connect system disclosed herein.

FIG. 19 illustrates an example method by which a user may view other users operating on the example connect system disclosed herein.

FIG. 20 illustrates an example method by which a user may view another map of the current location of others users operating on the example connect system disclosed herein.

FIG. 21 illustrates an example method by which a user may view comments posted to a social media application on the example connect system disclosed herein.

FIG. 22 illustrates an example method by which a user may view metrics regarding a retail establishment, enterprise, and/or personal performance on the example connect system disclosed herein.

DETAILED DESCRIPTION

The following description of example methods and systems is not intended to limit the scope of the description to the precise form or forms detailed herein. Instead the following description is intended to be illustrative so that others may follow its teachings.

A mobile application for connecting sales associates to various service systems is disclosed hereinbelow. In general, the system provides for mobile device connectivity for a sales associate to access various retail systems. In at least one example, the disclosed invention leverages mobile technology, chat functionality, social networking, rewards, electronic catalogs, marketing and/or sales data, retail online shopping technology and/or a consumers' social connections, such as through a social media website, to enable each sales associate to provide a customize and personal shopping experience for multiple customers while maintaining their retail location mobility.

In one example, the mobile application is a hybrid application delivered on mobile devices such as an iPod and/or an iPad. This example application may service multiple store associates in multiple locations across different and/or similar retail umbrellas. Still further the example application may serve as a single point of entry for tasks, applications, information, reports, and/or other suitable programs. Still further, users of the example applications may be provided with immediate access to their daily task lists, lead management, time-clock management, social media, store statistics, store performance, etc.

Figure 1:
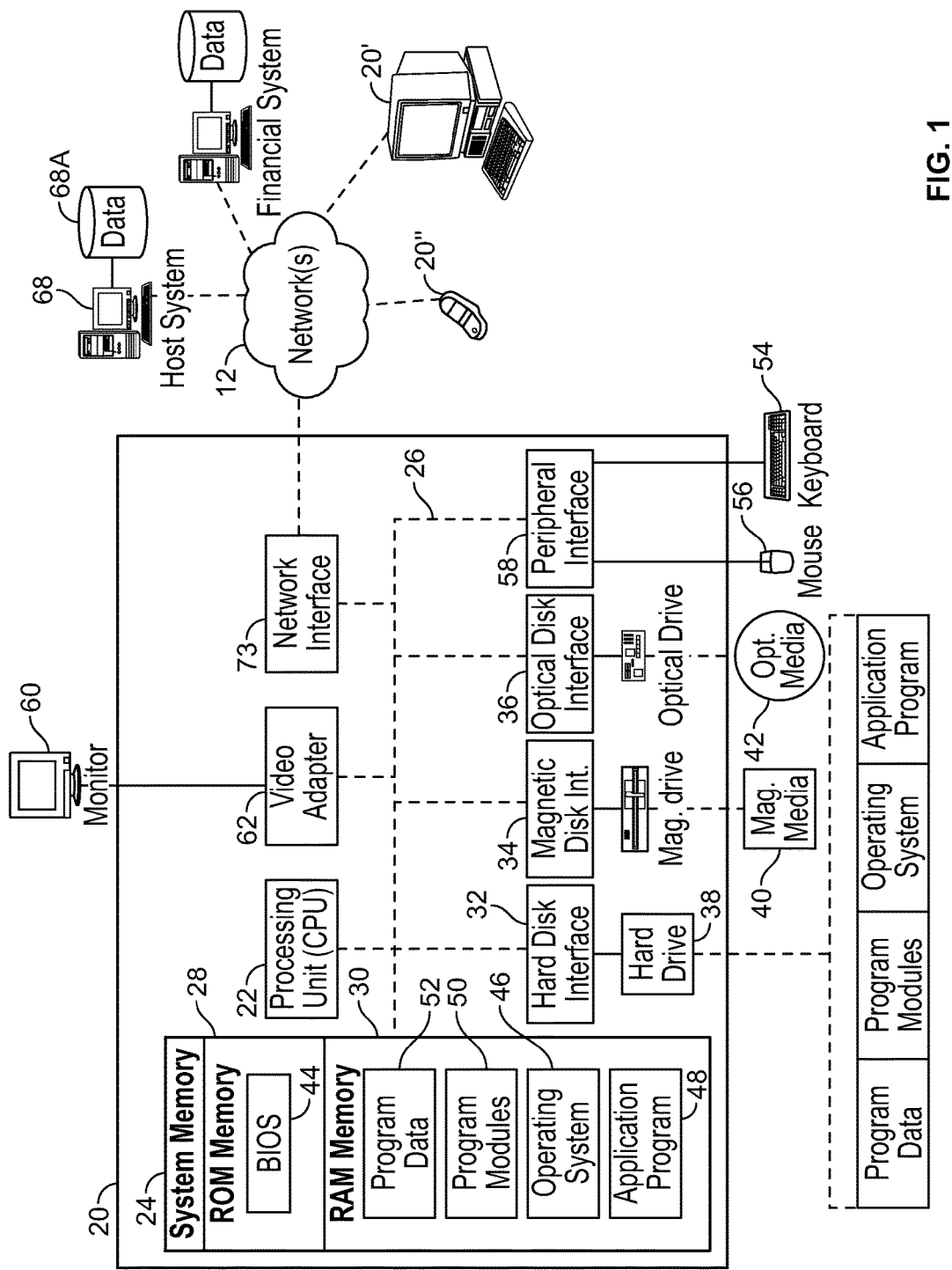
FIG. 1 illustrates in block diagram form components of an example computer network environment suitable for implementing the example methods and systems for connected sales associate service disclosed.

With reference to the figures, the following discloses various example systems and methods for providing a system for connectivity of a sales associate to a retail support network. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a retail organization to provide standard connectivity to a sales associate for accessing a host system server 68 and, among other things, for connecting to a hosted online retail environment (e.g. a retail store), a social networking site, a user profile, customer and/or sales support, other sales associates, personal shoppers, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, virtual keyboard, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, coordinating a personal shopper relationship, providing a social network, storing a user's personal information, facilitating recommendations, providing access to merchandise, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
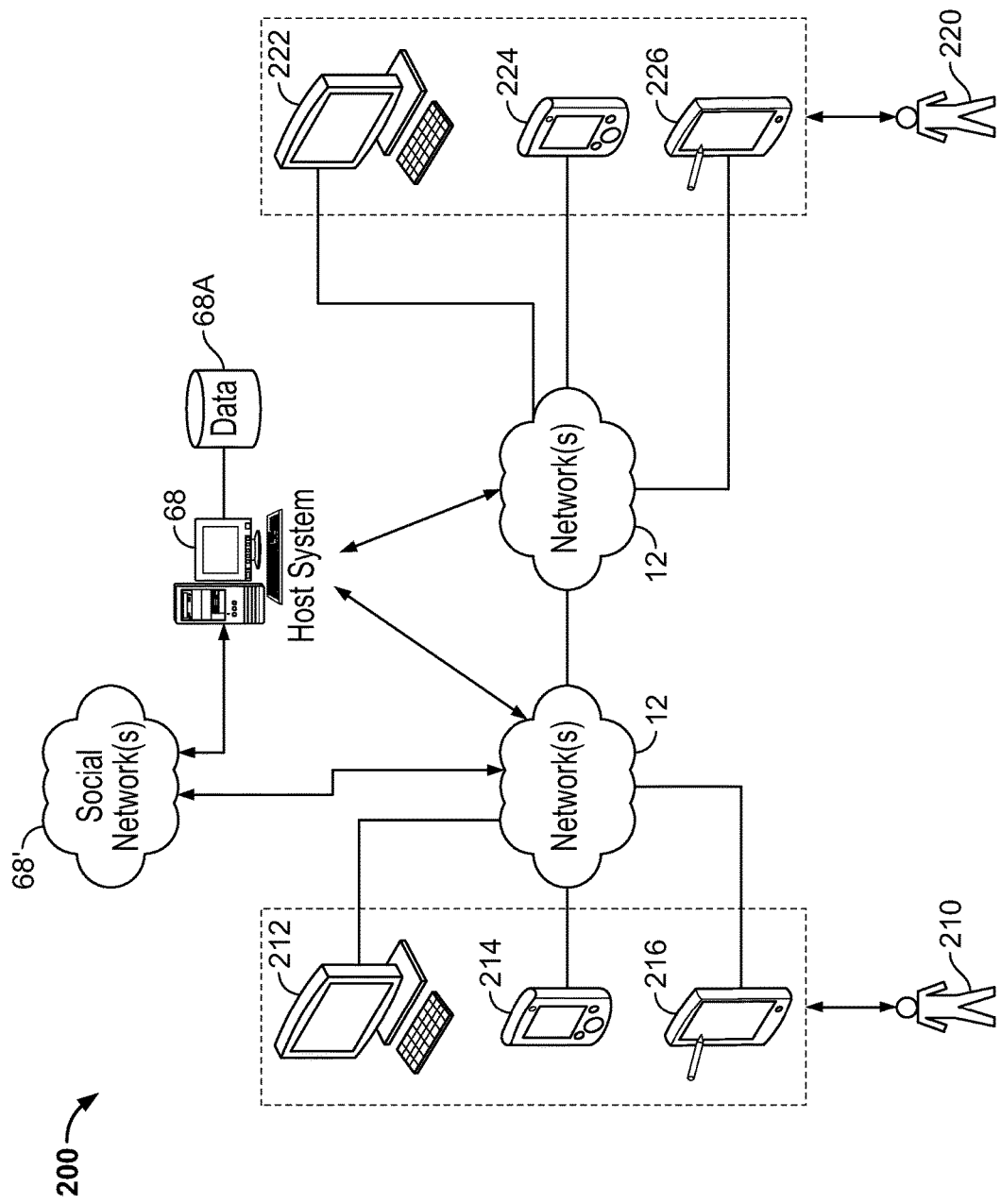
FIG. 2 illustrates an example connected sales associate system in accordance with the present disclosure.

Referring to FIG. 2, there is illustrated an overview of an example system 200 for providing multiple sales associates with access to multiple application providing connectivity to a retail environment's network in accordance with an example of the present disclosure. The system 200 is well-suited for operation on a distributed network system, such as, for example, a client-server architecture utilizing the Internet, cloud, mobile network, cellular network, or other suitable wired and/or wireless network. The system 200 may be implemented in various other communication networks and/or mediums as desired including, for example, a localized, non-distributed network.

Generally speaking, the system 200 is operable to facilitate online connectivity of multiple sale associates to various in-store applications as well as networked and/or non-networked data repositories. It will be appreciated by one of ordinary skill in the art that the number of sales associates concurrently using the system 200 may vary as desired. In the illustrated example, a first associate 210 may access the system 200 through any suitable device 20, such as a computer system 212, a smart phone 214, a tablet computer 216, or any other suitable known or yet to be developed communication device. In the disclosed example, the communication device 20 is capable of Internet browsing, textual transmission, and/or video transmission (e.g., video chat, video phone, etc), but it will be appreciated by one of ordinary skill in the art that the communication device may be any suitable communication device including any voice, email, and/or text communication with or without use of other transmission types.

Concurrently, in the illustrated example, a second sales associate 220 may also access the system 200 through any suitable device, such as a computer system 222, a smart phone 224, a tablet computer 226, or any other suitable known or yet to be developed communication device. Similar to the first user's devices, the communication devices 222, 224, 226 are each capable of Internet browsing, textual transmission, and/or video transmission (e.g., video chat, video phone, etc) as desired.

Each sales associate 210, 220 accesses the host server 68 through the network(s) 12. In this example, each associate 210, 220 accesses the system 68 through a separate network 12, but it will be appreciated that the network access may be architected in any suitable manner. Each of the network(s) 12 provides network routing utilizing a cloud based network, although any appropriate routing device (software, firmware, hardware, and/or the like) may be utilized. The connection between the user 210 and the user 220 may be through the network 12, through a social network 68', and/or through the host system 68.

The illustrated approach may take advantage of the convergence of mobile devices, IP telephony (e.g., VoIP, SIP, etc) and Internet application such as, for example, Facetime, Skype, etc. The example system 200 may also enable interactive communications amongst user across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

For allowing a user to setup and/or manage all of their sales associate tasks, messages, etc. the host server system 68 may make available to the sales associate one or more tools by which a sales associate can, for example, interact with graphical user interface elements to create, perform, manage and/or receive information such as sales data, point-of-sale interactivity, sales and/or marketing information, rewards information, credit information, manuals, retail store information, employment data and/or records, and/or any other suitable information.

Figures 3, 4:
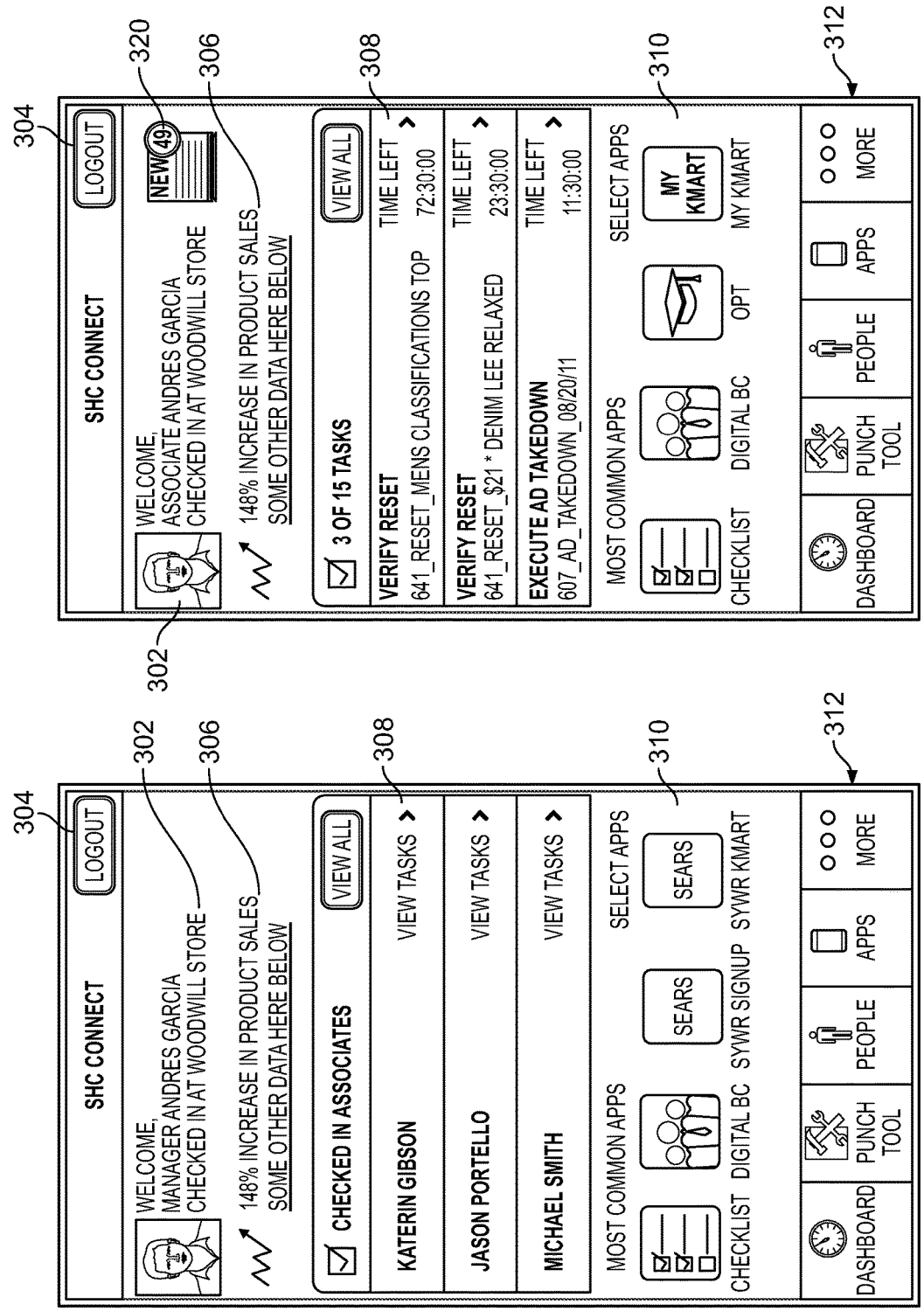
FIG. 3 illustrates an example method by which a user may be presented with a dash-board view of the connect application.
FIG. 4 illustrates an example method by which a user with different permissions may be presented with a dash-board view of the connect application.

By way of example only, FIG. 3 illustrates a screen shot of various management tools that may be provided to a sales associate at the user computer device 20 via the host system server 68. As illustrated, a sales associate management application 300 may include a sales associate area 302, by which a use can see information regarding the currently logged in sales associate, a logout selectable interface 304, which can be utilized to disconnect and/or deauthorize the device 20 from the server 68, a sales data area 306 to provide the sales associate with links to authorized sales data trends provided by the server 68, a listing area 308 providing a listing of sales associates logged into the system, an application area 310 proving a selectable listing and/or iconic view of available applications, and a navigation area 312 allowing quick navigation of various user interfaces as will be described herein. Additionally, any alerts, such as, for example any news alerts, may be displayed to the sales associate at an area 320 as illustrated in FIG. 4. It will be appreciated by one of ordinary skill in the art that these areas need not be displayed concurrently and/or in the exact manner as shown in FIG. 2 and that variations may be made as desired.

More particularly, once the user navigates to the sales associate management application 300 that is hosted in the host server system 68, a determination may be made as to whether or not the user is currently logged into the system as illustrated in FIG. 3. If the sales associate is not logged into the system and it is not indicated to the system that the user has otherwise previously used the sales associate management application 300, which indication may be stored in a cookie stored on the device 20, or may be provided as a dedicated device (e.g., permanently logged in as a specific user), the sales associate may be provided with a welcoming message and directed to the area 304 where the user may access a log-in procedure.

When the user is logged into the sales associate management application 300, the system may next determine the authorization level of the user by querying the server 68. Upon determination of the authorization level, the system may display different information to the sales associate. For example, as illustrated in FIG. 3, the sales associate is determined to be a manager at area 302. Accordingly, in this example, the area 308 may provide a listing of the associates reporting to the manager that are currently logged into the system. For example, login in as a manger may cause the server 68 to query the data repository 68A and/or any other suitable system component to determine the available sales associates currently logged into the system. It will be appreciated, however, that information provided to the user at the area 308 and/or any other area of the application 300 may be predetermined and/or otherwise defaulted based upon the authorization level of the user, and/or may be overwritten and/or other determined through user preferences set by the user and associated with the user log-in. In some example, the listing of sales associates may include a listing of all associated sales associates, with a visual indication on some and/or all users who are not currently logged into the system, such as graying-out, etc. As illustrated in FIG. 4, if the server 68 returns that the user of the application 300 is a sales associate reporting to a manager, the application 300 may display at the area 308 a listing of tasks assigned and/or other relevant information to the associate by a user of authority, such as for example the manager.

Turning now to FIG. 5, when a user presented with a listing of sales associates, as illustrated in FIG. 3 selects and/or otherwise indicates a selection of one of the listed associated (for example by clicking, touching, and/or hovering over the name of the associate), additional information regarding the selected associate is displayed to the user at an area 502. In particular, selection of the listed sales associate causes the server 68 to query the data repository 69A and/or an other suitable component, to return information specific to the individual chosen, and to which the user has the proper authorization to view, either through managerial hierarchy or privacy settings. In this example, the additional information regarding area 502 is a listing of associate tasks assigned to the associate. A example task management application is described in detail in U.S. Ser. No. 12/622,803, U.S. Publication No. 2011/0126123, incorporated herein by reference in its entirety. Additionally, the additional information my include the selected users name, photo, profile, and/or a contact method in an area 504.

Still further, as can be seen in FIG. 5, navigation to the specific associate details may also be obtained by selecting a "people" navigation area 506 on the navigation bar 312. It will be appreciated by one of ordinary skill in the art, however, that the name and/or location of the navigation area 506 may be varied as desired. Another example area 600 that may be displayed to the user upon selection of the navigation area 506 is illustrated in FIG. 6. In this example, selection of the "people" navigation area 506 causes the server 68 to query the data repository and/or any other suitable system component to return the status and/or listing of sales associates currently logged into the system, and/or currently unavailable as desired. The results of the query by the server 68 is displayed in an area 602. In the illustrated example, the listing includes all associates currently logged in to the application 300.

In still other example, (not shown) the listing may be filtered, sorted, and/or otherwise manipulated by the user as desired. Still further, the listing may by displayed as a list by selecting an area 604, as shown in FIG. 6. Alternatively, the listing of associates (and their associated availability) may be displayed as a map view 700 including an indication of each associate utilizing, for example, push-pin type indicators as are well known in the art, by selection an area 702 as shown in FIG. 7. In at least one example, selection of the area 702 may cause the server 68 to query the data repository 68A for a map and/or other illustration of the retail location in which the device 20 is located. It will be appreciated that the device 20 may be located through any known and/or yet to be discovered location service including, for instance, indoor GPS and/or network location services. Additionally, the server 68 may query each of the device 20 in use by the listed associates to determine their location as well in either real-time and/or through other location services including for instance check-in services. As will be understood by one of ordinary skill in the art, the location indicators may be updated as desired (e.g. to provide a real-time indication of their tracked location) and furthermore, the color and/or label of the indicator may be altered depending upon various status indicators including the user's role, association with the user, etc. In at least one example, the map view may be filtered by selecting the area 704 to cause the application to remove and/or highlight certain individuals and/or items in the map view as desired.

Turning now to FIG. 8, in order to provide shift time-clock management tools, the example application 300 is provided with a "punch tool" application area 802. In this example, selection of the area 802 causes the server 68 to query the current time-clock status of the logged in associate and present an area 804 to the user showing the results of the query. For instance, the area may displayed the current users employment identification umber and/or any other suitable identifier as well as any cumulative hours, punch-ins, punch-outs, breaks remaining, etc. The area 804 may also provide selectable punch-in/punch-out selections and/or break selections as illustrated. In this instance, as noted above, the server 68 may already return the current status of the user regarding the time-clock and gray out and/or other deactivate the various selections that are unavailable due to the status of the user. In any event, selection of any of the activated buttons will cause the server 68 to update the time-clock status of the individual user as necessary, and integration with the accounting/pay time-clock application hosted on the server 68 and/or any other suitable system component may be seamlessly achieved.

Figures 9, 10:
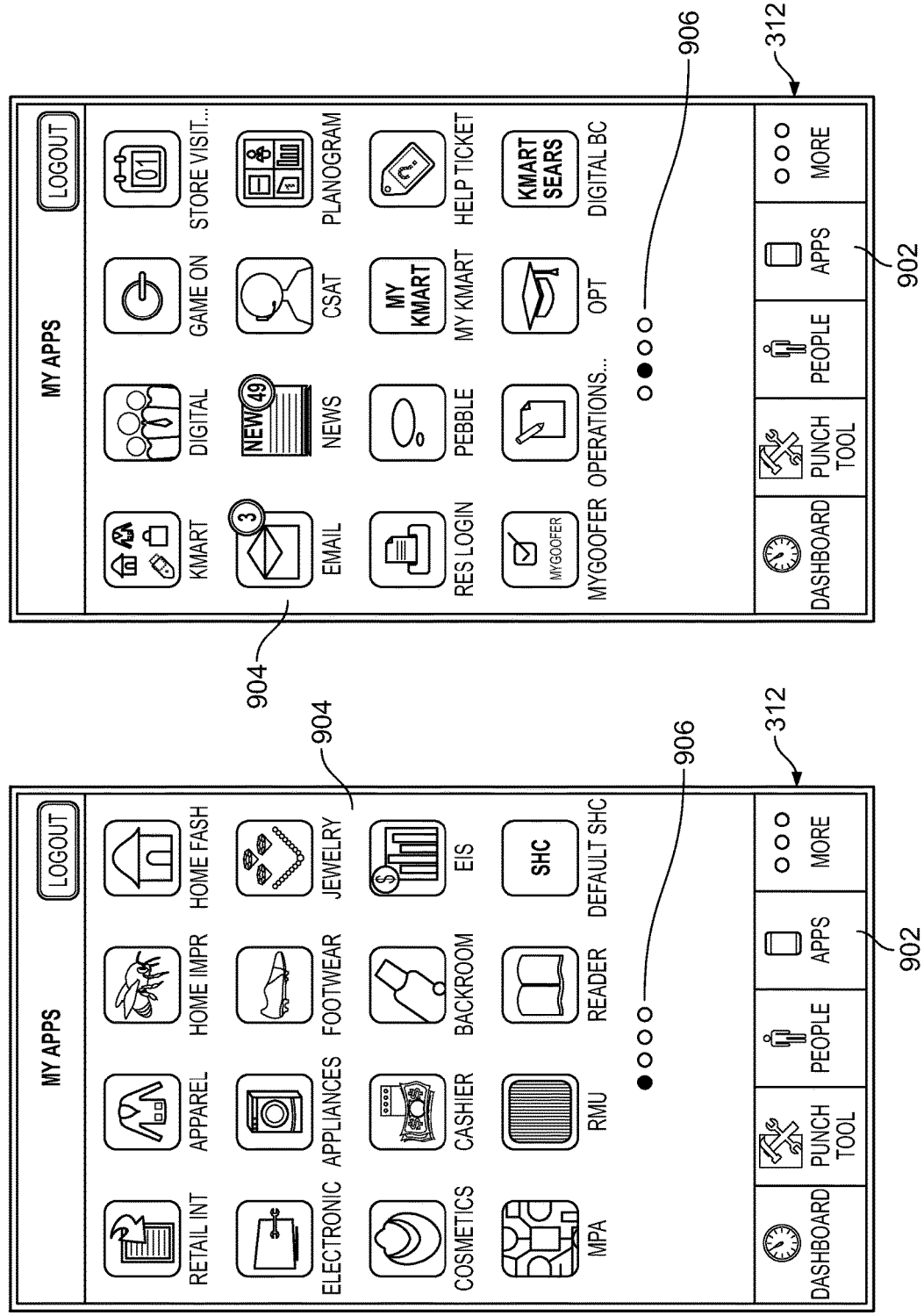
FIGS. 9 and 10 each illustrate an example method by which a user may view various application associated with the user.

Referring now to FIGS. 9 and 10, in order to provide various applications to the user, the system provides a menu of application by selecting the area 902 in the navigation bar 312. By selecting the area 902, the server 68 queries the data repository 68A to determine the pres-set and/or customized application available to the user. Alternatively, the application may be stored on the device 20 itself, and the user may have global access and/or restricted access to the applications based upon their login credentials. In the example of FIGS. 9 and 10, the applications are listed in the area 904 as thumbnail icons. It will be appreciated, however, by one of ordinary skill in the art that the method of displaying the applications may vary as desired including listing, etc. Additionally, the example area 904 includes a page indicator 906 to visually describe to the user what page the device is displaying in regard to the available applications. As can be appreciated, the application displayed in the area 904 may be a inclusive and/or exclusive set of the application provided for in the application area 310 shown in FIG. 3.

Figure 11:
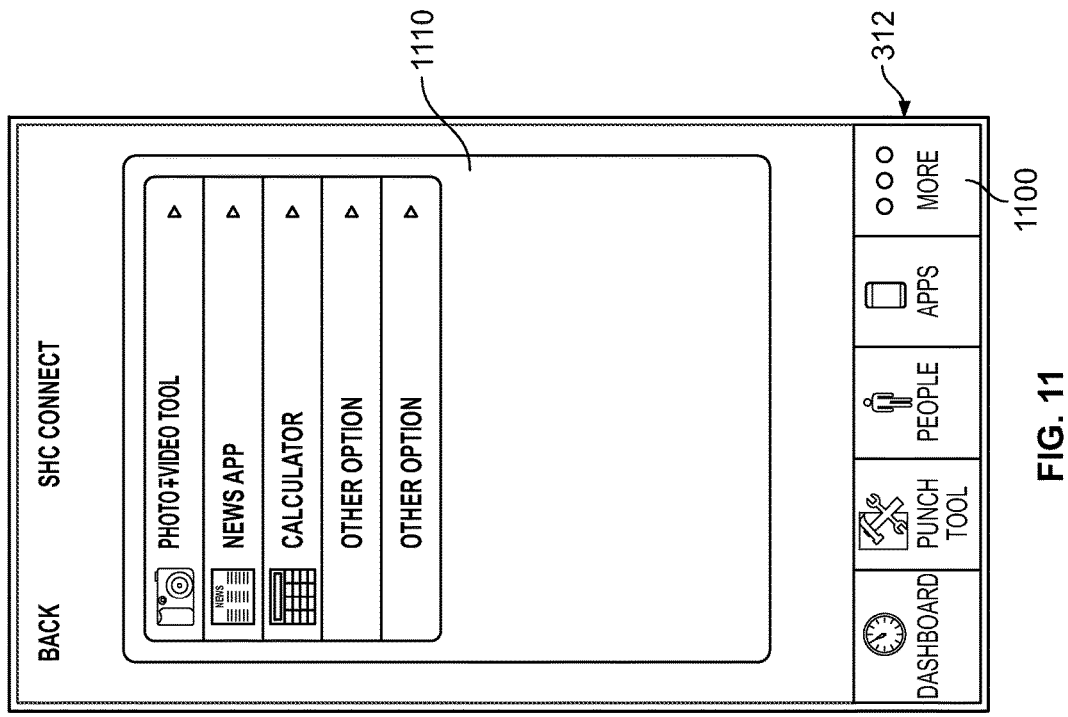
FIG. 11 illustrates an example method by which a user may view additional application associated with the user in a list format.

As illustrated in FIG. 11, the navigation area 312 may also present the user with an area 1100 for accessing additional application and/or items as desired. For example, in this instance, selection of the area 1100 causes the application to query the server 68 and thus provide the user with additional application and/or features as desired and as authorized by a query against the data repository 68A and/or a query against the device 20. In this example, the additional applications are listed in a selectable list view at the area 1110, although the application may be shown as selectable icons as per FIGS. 9 and 10.

Figure 12:
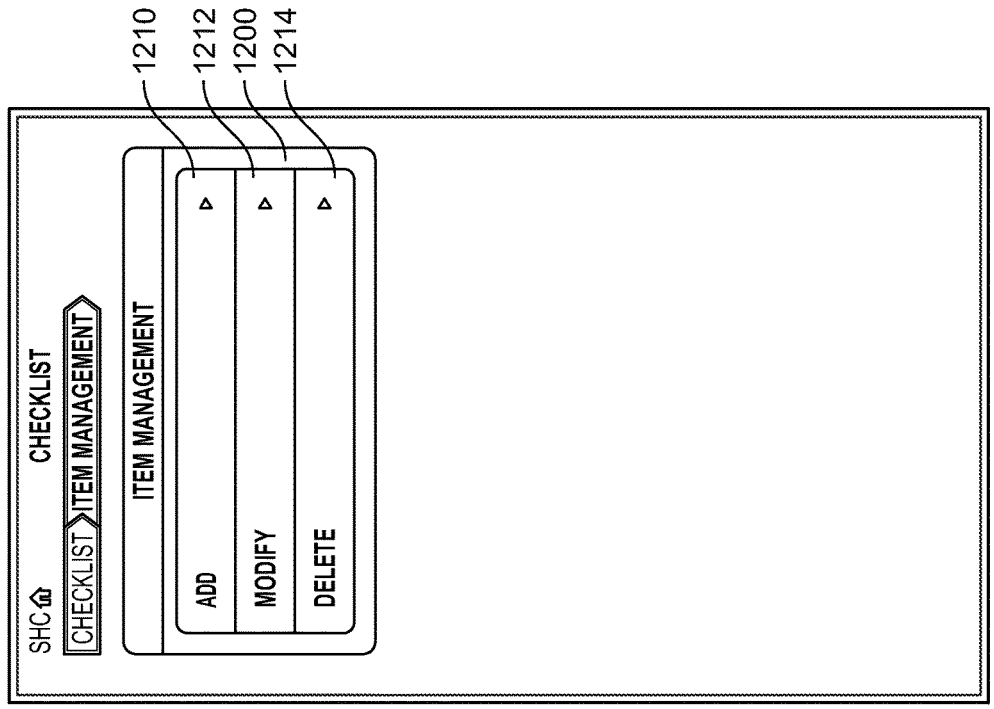
FIG. 12 illustrates an example method by which a user may add, modify, and/or delete an item management list.

Referring now to FIG. 12, there is illustrated an example interface 1200 showing the example application launched by the device 20 when a user selects the "Checklist" application as illustrated in the area 310 in FIG. 3. In this example, the checklist application allows the sales associate to add 1210, modify 1212, and/or delete 1214 to-do items and/or other notes that may be of interest to the sales associate. To populate and/or store the created items, the server 68 may query and/or store the information regarding the items on the data repository 68A. Furthermore, as previously noted, any suitable to-do checklist-type application may be provided including the to-do list previously described in U.S. application Ser. No. 12/622,803.

Figures 13, 14:
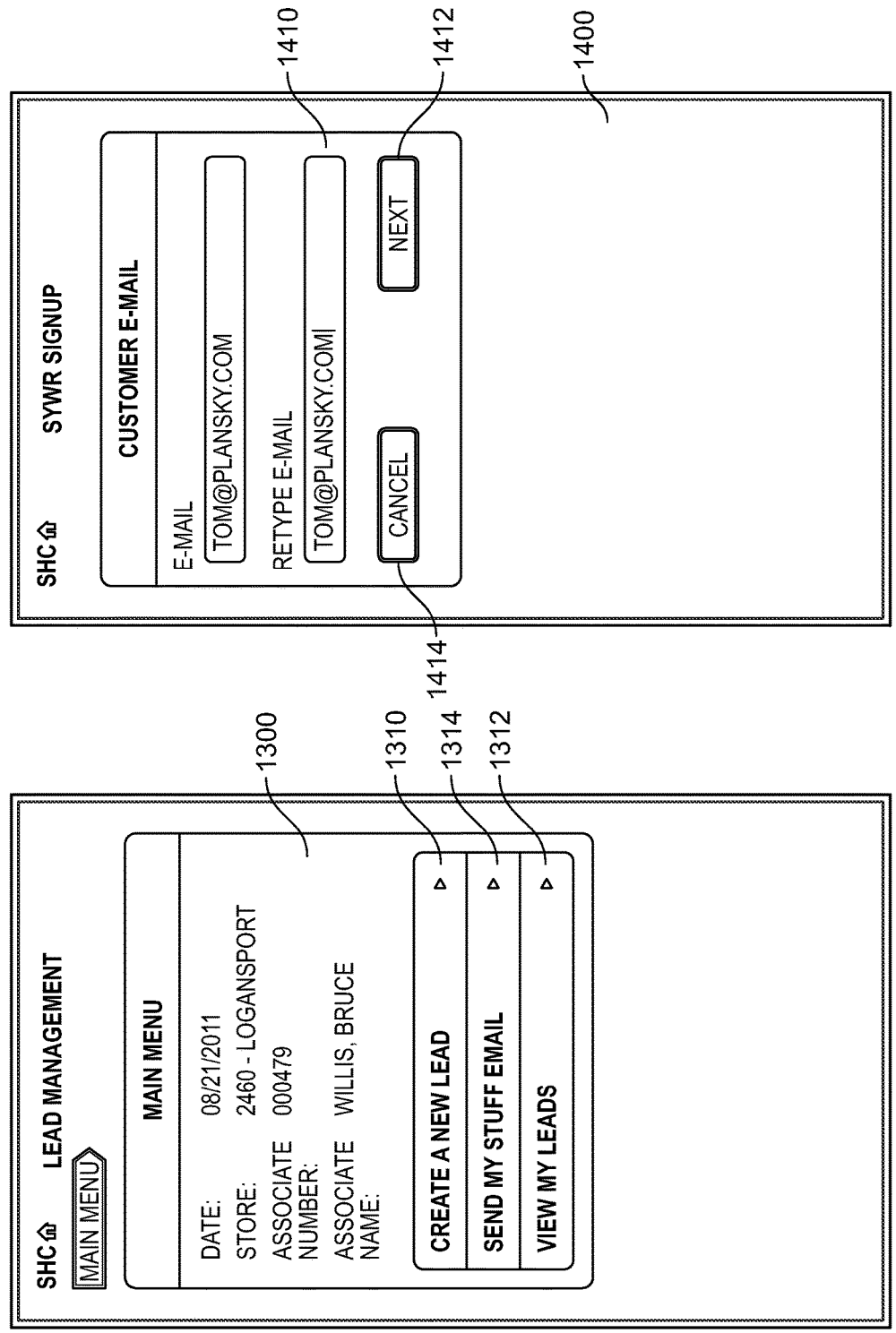
FIG. 13 illustrates an example method by which a user may view, create, and/or contact a sales force generated lead.
FIG. 14 illustrates an example method by which a user may lookup a rewards customer information.

Referring to FIG. 13, there is illustrated an example interface 1300 showing an example lead management application launched by the device 20 when the sales associate selects the "Digital BC" application as illustrated in the area 310 in FIG. 3. In this example, the lead management application is similar to the to-do list management application in that it allows the sales associate the ability to create a new lead 1310, view leads 1312, and/or contact leads 1314 as desired. Still further, similar to the to-do list application, to populate and/or store created leads, the server 68 queries and/or stores the information regarding the items on the data repository 68A and returns the relevant data to the device 20 for display.

Tuning now to FIGS. 14-18, to allow the sales associate to enroll the customer into a rewards program, the application provide for an example interface 1400 displayed by an example rewards log-in application launched by the device 20 when the sales associate selects the "SYWR Signup" application as illustrated in the area 310 in FIG. 3. In this example application, the device 20 may provide for a display 1410 to allow the sales associate to input information regarding the customer sufficient to allow the server 68 to lookup the customer information in it's membership database stored, for example in the data repository 68A. While in this example the customer email is provided in the interface 1410, any item suitable for identifying the customer may be utilized including the membership number, phone number, address, other id number, etc. By choosing the "next" button 1412, the sales associate causes the server 68 to perform a lookup in the data repository and in a match is available, display the customer information to the sales associate. As will be appreciated, the sales associate may be presented with the option of canceling the lookup at 1414.

If the server 68 fails to identify the customer, the server will cause the device 20 to display a customer sign-up at FIGS. 15-17 allowing the sales associate to enter an assigned rewards account number if available at 1500, enter and confirm the customer information at the interface 1600, and confirm that the customer has been enrolled with the server 68 at 1700. It will be appreciated by one of ordinary skill in the art that while the flow and interface diagrams illustrated are but one example enrollment process that may be used, various other enrollment processes may be utilized as desired without departing from the scope of the present disclosure.

Referring now to FIG. 18, there is illustrated an example interface 1800 that may be used by the device 20 to cause the server 68 to modify the application and/or number of application displayed to the user in the are 310 as illustrated in FIG. 3. In this way, the application may be truly customized to meet each of the sales associate's individual needs.

Referring now to FIGS. 19-26, there is illustrated additional example user interfaces to provide a digital experience for a sales associate. In this example, the application provides for an integrated retail vision that dramatically improves the entire shopping experience in-store by connecting customers and sales associates to one another. In one example, the present shopping experience may include a mobile video chat session as described in U.S. application Ser. No. 13/273,459, entitled "Systems And Methods For Providing A Distributed Mobile Call Center For A Service Establishment," filed Oct. 14, 2011, and incorporated herein by reference in its entirety. In another example, the present shopping experience may include an in-store assistance application as described in U.S. application Ser. No. 13/364,441, entitled "Methods And Systems For Providing Location Based Assistance Via A Mobile Device," filed Feb. 2, 2012, and also incorporated herein by reference in its entirety.

As described in the identified applications, the present connected application may provide a customer with assistance in-store and may allow a sales associate the enhanced ability to provide the support. In particular, in one example the application may allow a customer to walk into a retail establishment and provide a "check-in" and/or other identification means to inform the application of the customer's presence. As illustrate in FIG. 19, in this example, an interface 1900 causes the server 68 to query the data repository and/or the social network 68' to determine which sales associates 1910 and which customers 1920 have "checked-in" at the location. In this interface 1900, the sales associate can see who the other associates are in the store and they can determine which customers are nearby and may require service.

For instance, as illustrated in FIG. 20, another interface 2000 may be similar to the map view of FIG. 7 in that the sales associate can see both other sales associates as well as customer. In this instance the sales associate can view themselves on the store map and can also see a map of other associates and customers to maximize customer coverage. In addition, the sales associate can hover over and/or otherwise select the customer or sales associate to "push-to-talk", text, email, video chat, and/or otherwise communicate with the selected person. The technical capabilities to support this functionality may be provided by any suitable in-store navigation aid including Wi-Fi, indoor GPS, etc. In the illustrated example, the sales associate can also see how many associates and/or customers are using the application at the area 2010, which causes the server 68 to return the location and status of all the users of the system. In one example, the sales associate may also view photos at area 2012, comments at area 2014, and various store metrics at area 2016, which as described may be stored at the server 68, on the device 20, and/or at any other suitable location. Still further, the sales associate may zoom in and see exactly where the other associates and/or check-ins are located within the department by utilizing the typical zoom bar 2020.

Turning to FIG. 21, there is illustrated an example interface 2100 showing comments from selected the area 2016. As shown, the sales associate can click-on and/or otherwise select the comments tab 2014 and view all posts on any social networking feed such as, for example, Pebble, Twitter, etc., related to the sales associate's associated retail establishment. As will be understood, in the area 2100, the use may be able to view, post, reply, and/or otherwise manipulate various social media posts.

Similarly, as illustrated in FIG. 22, there is illustrates an example interface 2200 showing various store metrics. In the illustrated interface, a month-to-date (MTD) metrics is viewed and may be tied into any suitable metric measurement application running on the server 68 and/or the device 20 such as, for example, GameOn Metrics. As will be understood, the metrics view may be filtered, sorted, manipulated in any desired manner for providing meaningful store measurements to the sales associate, including enterprise level, region level, store level (e.g. local), department level, and/or sales associate level.

Figures 23, 24:
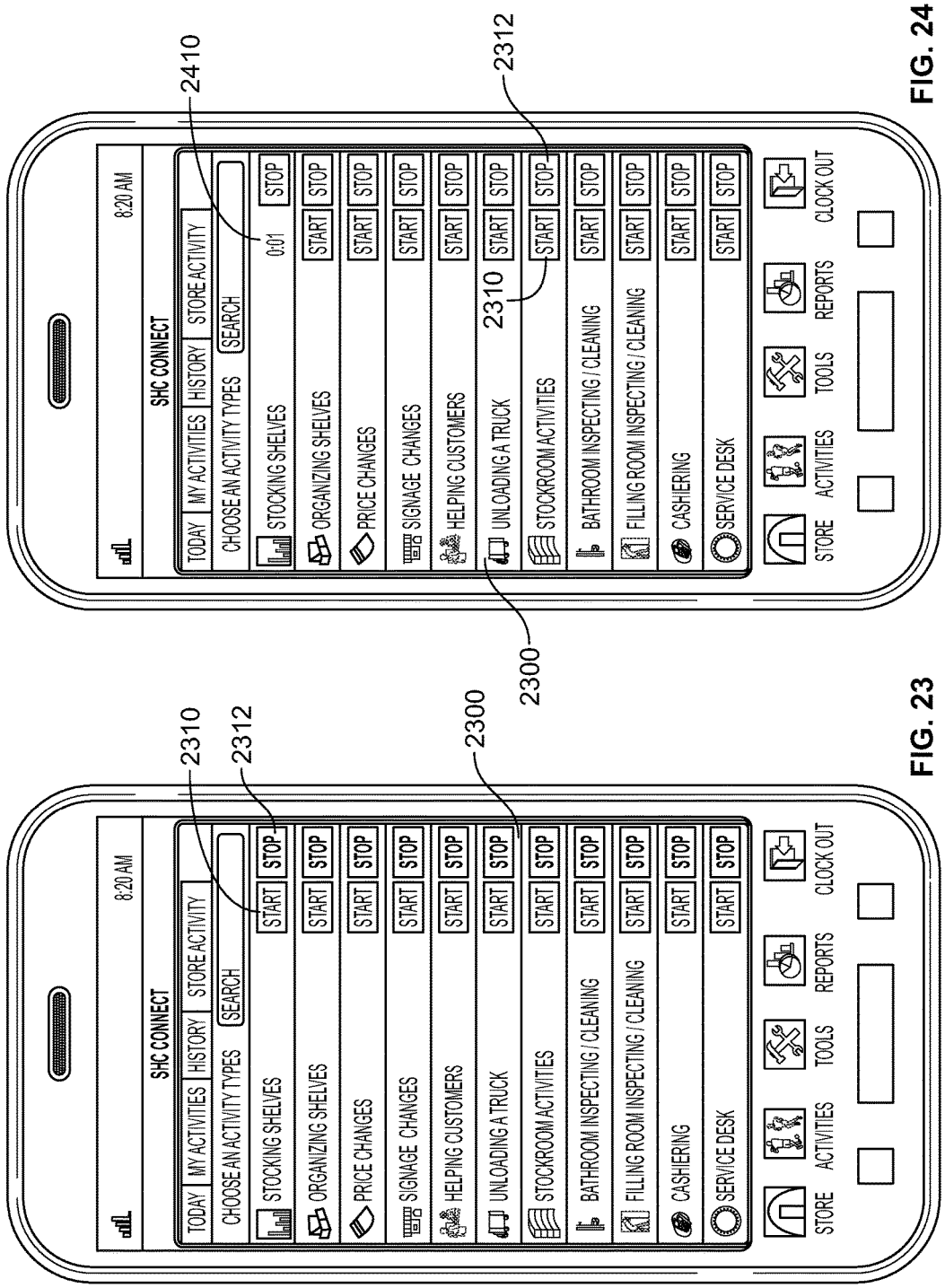
FIGS. 23 and 24 together illustrate an example method by which a user may view and monitor activities associated with the job of the sales associate on the example connect system disclosed herein.

Examining now FIGS. 23 and 24, there is shown an example interface 2300 for displaying various activities that may be predetermined for performance by the sales associate, such as, for instance, stocking shelves, organizing shelves, price changes, signage changes, helping customers, unloading a truck, stockroom activities, inspections/cleanings, cashiering, service desk, etc. The sales associate may simply go about their daily activities as they normally do, with the added ability to track the amount of time spent on each task by selecting a start button 2310 and/or a stop button 2312. As shown in FIG. 24, selecting the activity type may display a clock 2410 showing the elapsed time on each task.

Figures 25, 26:
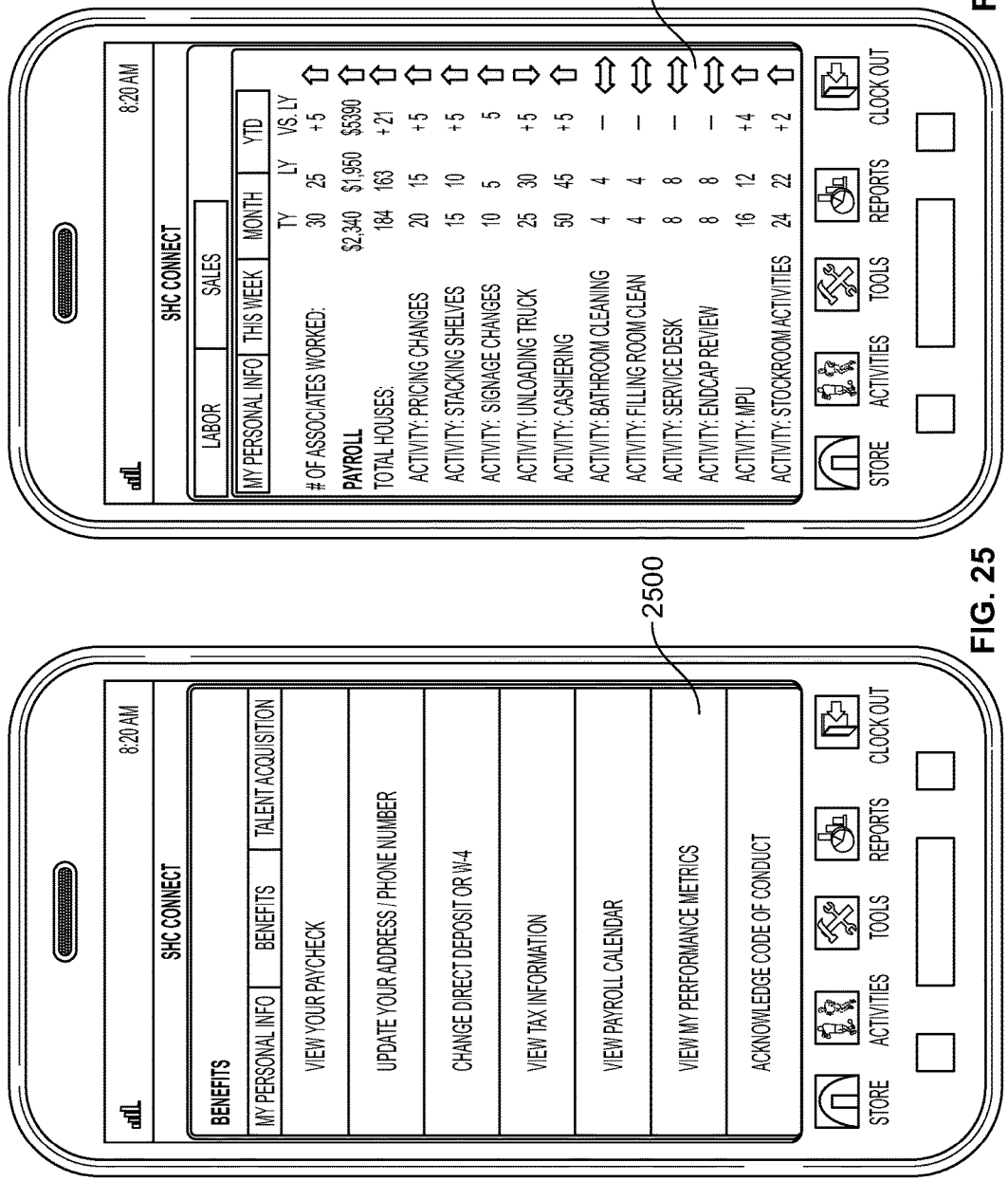
FIG. 25 illustrates an example method by which a user may view personal information on the example connect system disclosed herein.
FIG. 26 illustrates an example method by which a user with proper authorization may view various report data on the example connect system disclosed herein.

Still further as illustrated in FIG. 25, the application may cause the device 20 to query the server 68 to provide the sales associate with private information regarding the employment of the sales associate. In particular, the associate may choose a benefits application that allows the sales associate to see their personal information that may be of value to the associate, such as paycheck information, address/contact information, paystub information, tax information, calendar, performance metrics, benefits, etc. It will be appreciated by one of ordinary skill in the art that the privacy concerns associated with providing personal information over a shared device may be overcome by encryption, deletion of stored data, etc. as desired. In addition to personal information, the sales associate may be able to review human resources specific information including job postings, new hire information, orientation information, etc.

Finally, as illustrated in FIG. 26, the sales associate may be provided with sufficient authorization to review the performance of various individuals in the retail organization at an interface 2600. In this example, as a store manager, the sales associate would have information available such as the number of associates worked, total hours, payroll, hours by activity, etc. In one embodiment, the interface 2600 displays a comparison of how the displayed metrics change over time and/or a comparison between one retail location and another location. Productivity may be provided in the results and store and/or provided by the server 68 as an enterprise as desired.

Still further, as previously noted, the application may provide the sales associate with the ability to "talk" to other customers and/or sales associate on additional devices 20. In one example, the application may provide a push-to-talk feature for a two-way full duplex peer-to-peer voice call. The example application may support live talking and allow other applications to operate independently by utilizing, for instance an SIP protocol which may be used on any suitable device 20 such as an iPad and/or an iPod Touch. While communication may be limited to interaction within a single store, utilizing a single Wi-Fi network, communication may be broadened to other locations and/or devices as desired. Additionally, the application ensures good voice quality & low battery usage, while providing in-coming call notification including caller's name and/or caller's photo provided by the server 68 and/or the device 20.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transitory computer-readable media having stored thereon computer executable instructions, wherein the instructions perform steps for connecting a sales associate to a central server via a mobile computing device, comprising:
   hosting a database of information regarding the sales associates and operational information regarding a retail establishment;
   displaying a user interface comprising user interface elements for allowing the sales associate to access a central server for the retail establishment, the user interface providing access to the central server through a network, the central server allowing multiple additional sales associates on multiple additional mobile devices to access the central server;
   providing mobile point-of-sale support by providing that the user interface includes a touch-sensitive screen;
   causing the user interface to access multiple channels using a single mobile platform for use by the sales associate, wherein the multiple channels include a customer social networking channel that accesses a social network website of the customer and customer contacts of the social network website, a retail channel, a voice over Internet communications channel, a customer rewards channel, and a mobile point-of-sale channel;
   causing the user interface to display trending sales data for the retail establishment that have been authorized for viewing by the sales associates; and
   determining, by one or more location determining devices, real-time locations of the sales associates and customers;
   causing the user interface to display a list view and a map view of the sales associates and customers that have checked-in, wherein the map view of the user interface displays the real-time locations of the sales associates and customers on a map of the retail establishment, and wherein the user interface initiates communications with selected sales associates and customers, via email, text message, voice communication, or video communication, by selecting graphical user interface elements corresponding to the selected sales associates and customers on the map of the retail establishment,
   wherein the voice over Internet communications channel supports live voice communications and concurrently allows other applications to operate independently of the live voice communications, wherein the user interface causes the central sever to query the database to return and display information regarding sales data for the retail establishment, wherein the user interface causes the central server to return and display information regarding the sales associates accessing the central server and social network information about customers through one or more social network websites, wherein the user interface provides interactive communications with other user interfaces across different types of operating system platforms, and wherein the user interface allows the sales associate to select the displayed information regarding one of the sales associates accessing the central server, wherein the sales associate can view, create, delete, or assign a task to the selected sales associate if the sales associate has requisite authority in managerial hierarchy.

2. The computer-readable media according to claim 1, wherein the instructions provide for a listing of sales associates accessing the central server to be presented in the map view.

3. The computer-readable media according to claim 1, wherein the instructions provide for the display of multiple applications to the user.

4. The computer-readable media according to claim 1, wherein the instructions provide for a listing of tasks associated with the sales associate.

5. The computer-readable media according to claim 1, wherein the user interface is provided on one or more of the following: a mobile personal computer, a personal-digital assistant ("PDA"), a cellular telephone, a mobile device, a tablet, and an ereader.

6. The computer-readable media according to claim 1, wherein the instructions provide for access by the sales associate to a time-keeping application.

7. The computer-readable media according to claim 1, wherein the instructions provide for task items displayed within a to-do list to be filtered via the permission level of the sales associate.

8. The computer-readable media according to claim 1, wherein the instructions provide for the sales associate to access a membership portion of a rewards program.

9. The computer-readable media according to claim 8, wherein the instructions further provide for the sales associate to create a new record in the membership portion of the rewards program.

10. The computer-readable media according to claim 1, wherein the instructions provide for allowing the sales associate to add one or more customer leads to a lead management list.

11. The computer-readable media according to claim 10, wherein the instructions provide for allowing the sales associate to designate a customer lead item within the lead management list as requiring a follow-up action.

12. A non-transitory computer-readable media having stored thereon computer executable instructions, wherein the instructions perform steps for connecting a sales associate to a central server via a mobile computing device, comprising:

hosting a database of information regarding the sales associates and operational information regarding a retail establishment; and displaying a user interface comprising user interface elements for allowing the sales associate to access a central server for the retail establishment and to access social network information about customers through one or more social network websites, the central server allowing multiple additional sales associates on multiple additional mobile devices to access the central server, the user interface providing access to the central server through a network;

providing mobile point-of-sale support by providing that the user interface includes a touch-sensitive screen; and causing the user interface to access multiple channels using a single mobile platform for use by the sales associate, wherein the multiple channels include a customer social networking channel that accesses a social network website of the customer and customer contacts of the social network website, a retail channel, a voice over Internet communications channel, a customer rewards channel, and a mobile point-of-sale channel;

causing the user interface to display trending sales data for the retail establishment that have been authorized for viewing by the sales associates;

causing the user interface to query at least the customer social networking channel to determine if particular customers are present at the retail establishment; and determining, by one or more location determining devices, real-time locations of the sales associates and customers;

causing the user interface to display a list view and a map view of the sales associates and customers that have checked-in, wherein the map view of the user interface displays the real-time locations of the sales associates and customers on a map of the retail establishment, and wherein the user interface initiates communications with selected sales associates and customers, via email, text message, voice communication, or video communication, by selecting graphical user interface elements corresponding to the selected sales associates and customers on the map of the retail establishment, wherein the voice over Internet communications channel supports live voice communications and concurrently allows other applications to operate independently of the live voice communications, wherein the user interface provides interactive communications with other user interfaces across different types of operating system platforms, wherein the user interface displays an application that causes the central server to query a current-time clock status of logged-in sales associates and provides punch-in and punch-out tools for shifts and breaks, wherein the user interface causes the central server to provide information about other sales associates if the sales associate has requisite authority in managerial hierarchy, and wherein the user interface causes the central sever to query the database to allow the associate to be assigned and check-out a mobile device.

13. The computer-readable media according to claim 12, wherein the user interface further causes the central server to query the database to allow the associate to return and check-in the mobile device.

14. The computer-readable media according to claim 12, wherein the mobile device tracks the mobile device within a predefined area within the retail establishment.

15. The computer-readable media according to claim 14, wherein the central server includes a display to display information regarding the location of the tracked mobile device.

16. A non-transitory computer-readable media having stored thereon computer executable instructions, wherein the instructions perform steps for connecting a sales associate to a central server via a mobile computing device, comprising:
  hosting a database of information regarding the sales associates and operational information regarding a retail establishment;
  displaying a first user interface comprising user interface elements for allowing the sales associate to access a central server for the retail establishment, the first user interface providing access to the central server through a network that is separate from the network used by one of the other sales associates, the user interface elements providing interactive communications with other user interfaces across different types of operating system platforms, the user interface elements providing a list of sales associate tasks and tracking an amount of time spend spent on each sales associate task, the central server allowing multiple additional sales associates on multiple additional mobile devices to access the central server, the central server allowing the sales associate to access social network information about customers through one or more social network websites, the central server allowing the sales associate to view sales associates that are currently logged on;
  providing mobile point-of-sale support by providing that the first user interface includes a touch-sensitive screen;
  causing the first user interface to access multiple channels using a single mobile platform for use by the sales associate, wherein the multiple channels include a customer social networking channel that accesses a social network website of the customer, customer contacts of the social network website, and a social networking feed related to the retail establishment, a retail channel, a voice over Internet communications channel, a customer rewards channel, and a mobile point-of-sale channel;
  causing the first user interface to display trending sales data for the retail establishment that have been authorized for viewing by the sales associates;
  causing the first user interface to query at least the customer social networking channel to determine which customers and which sales associates are present at the retail establishment,
  supporting live voice communications on the voice over Internet communications channel and concurrently allowing other applications to operate independently of the live voice communications;
  displaying a second user interface comprising user interface elements for allowing a customer to access the central server for the retail establishment to indicate to the central server the presence of the customer within the retail establishment;
  determining, by one or more location determining devices, real-time locations of the sales associates and customers; and
  causing the first user interface to display a list view and a map view of the sales associates and customers that have checked-in, wherein the map view of the first user interface displays the real-time locations of the sales associates and customers on a map of the retail establishment, and wherein the first user interface initiates communications with selected sales associates and customers, via email, text message, voice communication, or video communication, by selecting graphical user interface elements corresponding to the selected sales associates and customers on the map of the retail establishment.

17. The computer-readable media according to claim 16, wherein the central server tracks the location of at least one of the sales associate or the customer within a predefined area within the retail establishment.

18. The computer-readable media according to claim 17, wherein the central server is adapted to cause the mobile device to display information regarding the location of at least one of the sales associate or the customer within a predefined area within the retail establishment.

19. A non-transitory computer-readable media having stored thereon computer executable instructions, wherein the instructions perform steps for connecting a sales associate to a central server via a mobile computing device, comprising:
  hosting a database of information regarding the sales associates and operational information regarding a retail establishment;
  displaying a user interface comprising user interface elements for allowing the sales associate to access a central server for the retail establishment and for allowing the sales associate to access social network information about customers through one or more social network websites, the user interface providing access to the central server through a network, the user interface elements providing interactive communications with other user interfaces across different types of operating system platforms, the user interface elements providing an application that causes the central server to query a current-time clock status of logged-in sales associates and to provide punch-in and punch-out tools for shifts and breaks, the central server allowing multiple additional sales associates on multiple additional mobile devices to access the central server, wherein the central server is adapted to provide broadcast news information to the mobile device;
  providing mobile point-of-sale support by providing that the user interface includes a touch-sensitive screen;
  causing the user interface to access multiple channels using a single mobile platform for use by the sales associate, wherein the multiple channels a customer social networking channel that accesses a social network website of the customer and customer contacts of the social network website, a retail channel, a voice over Internet communications channel, a customer rewards channel, and a mobile point-of-sale channel;
  causing the user interface to display trending sales data for the retail establishment that have been authorized for viewing by the sales associates;
  determining, by one or more location determining devices, real-time locations of the sales associates and customers; and
  causing the user interface display a list view and a map view of the sales associates and customers that have checked-in, wherein the map view of the user interface displays the real-time locations of the sales associates and customers on a map of the retail establishment, and wherein the user interface initiates communications with selected sales associates and customers, via email, text message, voice communication, or video communication, by selecting graphical user interface elements corresponding to the selected sales associates and customers on the map of the retail establishment;
  causing the user interface to query at least the customer social networking channel to determine which customers and which sales associates have checked in at the retail establishment, and supporting live voice communications on the voice over Internet communications channel and concurrently allowing other applications to operate independently of the live voice communications.

20. The computer-readable media according to claim 19, wherein the broadcast news is customized for the sales associates accessing the central server through the mobile device.

21. The computer-readable media according to claim 20, wherein the broadcast news is restricted based upon the hierarchical role of the sales associate within the retail establishment.

22. A non-transitory computer-readable media having stored thereon computer executable instructions, wherein the instructions perform steps for connecting a sales associate to a central server via a mobile computing device, comprising:

hosting a database of information regarding the sales associates and operational information regarding a retail establishment;

displaying a user interface comprising user interface elements for allowing the sales associate to access a central server for the retail establishment and to access social network information about customers through one or more social network websites, the user interface providing access to the central server through a network that is separate from the network used by one of the other sales associates, the user interface elements providing interactive communications with other user interfaces across different types of operating system platforms, the central server allowing multiple additional sales associates on multiple additional mobile devices to access the central server;

providing mobile point-of-sale support by providing that the user interface includes a touch-sensitive screen;

causing the user interface to access multiple channels using a single mobile platform for use by the sales associate, wherein the multiple channels include a customer social networking channel that accesses a social network website of the customer, accesses customer contacts of the social network website, and manipulates social network posts, a financial channel, a voice over Internet communications channel, a customer rewards channel, and a mobile point-of-sale channel;

causing the user interface to display trending sales data for the retail establishment that have been authorized for viewing by the sales associates;

determining, by one or more location determining devices, real-time locations of the sales associates and customers;

causing the user interface to display a list view and a map view of the sales associates and customers that have checked-in, wherein the map view of the user interface displays the real-time locations of the sales associates and customers on a map of the retail establishment, and wherein the user interface initiates communications with selected sales associates and customers, via email, text message, voice communication, or video communication, by selecting graphical user interface elements corresponding to the selected sales associates and customers on the map of the retail establishment; and supporting live voice communications on the voice over Internet communications channel and concurrently allowing other applications to operate independently of the live voice communications, wherein the user interface provides an application that causes the central server to query a current-time clock status of logged-in sales associates and to provide punch-in and punch-out tools for shifts and breaks, and wherein the mobile device is adapted to provide a photo to the central server.

23. The computer-readable media according to claim 22, wherein the mobile device includes a camera device, and wherein the camera device provides the photo.

24. The computer-readable media according to claim 22, wherein the central server provides a photo album on the database, and wherein the provided photo is stored within the photo album.

* * * * *